(12) United States Patent
Melkesetian (10) Patent No.: US 7,555,260 B2
(45) Date of Patent: Jun. 30, 2009

(54) COMMUNICATIONS NETWORK EXTENSION VIA THE SPONTANEOUS GENERATION OF NEW CELLS

(75) Inventor: William Melkesetian, 220 Clifton Ave., Kingston, NY (US) 12401

(73) Assignee: William Melkesetian, Kingston, NY (US)

( * ) Notice: Subject to any disclaimer, the term of this patent is extended or adjusted under 35 U.S.C. 154(b) by 394 days.

(21) Appl. No.: 11/251,277

(22) Filed: Oct. 17, 2005

(65) Prior Publication Data

US 2007/0087738 A1   Apr. 19, 2007

(51) Int. Cl.
*H04B 7/15* (2006.01)
(52) U.S. Cl. ............... 455/11.1; 455/41.2; 455/41.3; 455/446; 455/449; 455/561; 370/310; 370/315; 370/338
(58) Field of Classification Search ............ 455/11.1, 455/41.2, 41.3, 446, 449, 561; 370/310, 370/315, 338
See application file for complete search history.

(56) References Cited

U.S. PATENT DOCUMENTS

| | | | | |
|---|---|---|---|---|
| 4,771,448 A | * | 9/1988 | Koohgoli et al. | ............. 455/450 |
| 5,434,798 A | * | 7/1995 | Madebrink et al. | ........... 709/221 |
| 5,533,099 A | * | 7/1996 | Byrne | ...................... 455/552.1 |
| 6,049,564 A | * | 4/2000 | Chang | ......................... 375/130 |
| 6,829,491 B1 | * | 12/2004 | Yea et al. | ...................... 455/560 |
| 6,937,863 B1 | * | 8/2005 | Gordon et al. | .............. 455/446 |
| 7,162,203 B1 | * | 1/2007 | Brunner | ..................... 455/63.1 |
| 2002/0077151 A1 | * | 6/2002 | Matthews et al. | ........... 455/561 |

* cited by examiner

*Primary Examiner*—Stephen M D'Agosta

(57) ABSTRACT

A cell phone base station transceiver capable of spontaneously and substantially automatically creating a new additional cells in a communication network. The new cell provides an indiviual-Point-Of-Connect, which will be referred to as iPOC, for cell phone users that address many of these and other problems by providing standard wireless cell phone communication in areas where no cell phone service exists or within dead zones in existing cell phone network cells. Various embodiments of the iPOC include a portable, substantially-automated, user-installable dynamically-configurable cell phone base station device. The iPOC system address many of the current quality of service issues cell phone users commonly experience as well as other problems.

9 Claims, 9 Drawing Sheets

COMMUNICATIONS NETWORK EXTENSION VIA THE SPONTANEOUS GENERATION OF NEW CELLS

FIELD OF INVENTION

The present invention relates to systems and methods for quickly and dynamically providing cell phone service in areas where no service exists and for enhancing service is areas supposedly with coverage, but where signal strength in intermittent, weak of nonexistent.

BACKGROUND

The telecommunication's industry had undergone tremendous growth and change since Alexander Graham Bell first invented the telephone in 1876. During the 20th century we have seen the introduction and evolution of a public wire line network that provides reliable and affordable voice and low speed data communications throughout the world. Until fairly recently, the telephone system utilized analog signals over hardwired land-lines for home and business communication. The installation of land lines is difficult and expensive especially in less developed areas of the world.

Mobile telephone communication was initially provided through a radiotelephone system. Each city had a single central tower with roughly 25 communication channels available to a small number of users with radiophones in cars. The central antenna had sufficient power to transmit about 50 miles. The system also required a high power antenna be instilled in each vehicle.

More recently, wireless telephone communication, cellular and cordless telephony, have gained wide spread popularity, but due to current limitations wireless phone service has not substantially displaced public wire-line networks. Despite the convenience and added flexibility of mobile cellular, most cell phone users continue to have land-line phone service at home and at the office with unique phone numbers that are different from their cell phone numbers. One reason users have not switched entirely to cellular is that the quality of cell phone service does not always match what they have grown accustomed to with the land-line service of the PSTN (Public Switched Telephone Network) or POTS (Plain Old Telephone System). Cell phone network coverage areas are often incomplete. There are dead zones in the network. Dead zones are small areas within a cell where signal strength in the cell phone providers network is weak or nonexistent High quality service everywhere in the network is not guaranteed.

The ultimate goal for wireless communication is to provide the end user with uninterrupted wireless communications capability anywhere without regard to location or mobility.

Both cellular and cordless telephony provide some degree of mobility for the end user. Cellular networks enables a cell phone, The mobile transceiver, to operate over a wide area throughout the network of cells. Cellular networks are designed to provide uninterrupted phone conversations to users traveling through the network by a hand-off of the call from one base station to another. The network is designed to attempt to provide seamless transfer of a call from one base station to another as the user crosses cell boundaries.

The basic cordless telephone proves a wireless alternative to the standard telephone. It utilizes a simple user installed base station that connects to a standard telephone interface of the PSTN to provide a limited range of mobility in a relatively small area. A single private cell is created in the vicinity of the base station typically 50 to 500 meters. Although there are some wireless PBX applications supporting cordless phones, most cordless phones are used in a very small area in the vicinity of a simple self installed base station connected to the PSTN.

Cell phone technology significantly increases the number of users that can simultaneously place wireless phone calls in the same geographic areas. Geographic region are divided into small cells allowing frequency reuse so that large numbers of people can simultaneously use their phones without interference. Cell phone networks can be complex configurations with smaller micro-cells existing within-larger macro cells. In a typical sample configuration each cell may be about 10 square miles. In general, all else being equal, as cell size decreases, the greater the frequency reuse, allowing much higher subscriber densities per MHz of spectrum. In other words, as cell size decreases system capacity increases.

Cell phone networks are comprised of individual cells that cover a specific geographic area within the network. Fixed position base station transceiver are used to create cells and the collection of cells constitute the network. It is a common mistake to believe that each cell has a centrally positioned transmitting tower and radio equipment known as a base station in the middle of the hexagon. Most cells are split into sectors to improve efficiency allowing them to carry more calls. Antennas normally transmit inward towards the center of each cell thus covering only a portion of each cell's geographic area, but not the whole cell. Each base station typically transmits and receives on 3 different sets of channels, one for each sector of the 3 cells it covers. Cells are commonly divided into 3 sectors, but sometime there are only 2 sectors and occasionally there are as may as 6. A cellular system will have coverage gaps and dead zones within cells, but the hexagonal shape makes it easier conceptually for the planner to visualize how the specific network is configured.

For simplicity, a cell is often conceptually thought of as a hexagon cell phone coverage grid created by a single base station transceiver. It is the geographic area in which a cell phone operates by communicating with a specific single base station. This is the definition of cell, what is meant, when the term is used hence forth in this document unless otherwise stated.

Base station installation necessary to create a cell site can be far easier and less expensive than land-line network installation; however, it requires preplanning and professional installation to ensure that adjacent cells in the network do not interfere with each other. The cellular network base stations typically have antenna that are positioned over 50 ft above the ground. These base stations are typically larger more permanent structures used to create standard cellphone network cells. Each cell typically has a coverage area radius of 0.5-30 km.

Thus a cell phone base station is a substantially fixed-permanent structure requiring substantial preplanning prior to installation. Operating frequencies must be selected to prevent interference with the preexisting cell networks in the area near where the base station will reside. Base station installation requires personnel with specialized skills to do the preplanning and install the base station. Even when temporary base stations are set up to handle unusually high call volumes in specific areas for things like sporting events, considerable preplanning work is required to set up and install these base stations.

A large number of these substantially fixed-permanent base stations, typically hundreds, are required in each geographic region to create a cell phone network. Each base station is connected to a Mobile Telephone Switching Office (MTSO). The MTSO controls all the base stations in the region and handles all the phone connections to other phone systems. The mobile cell phone and the base station transmissions within the cell do not propagate very far outside the cell because each has low power transmitters. Many cell phones have multiple signal strengths (e.g. 3 Watts and 0.6 Watts) to help reduce interference and conserve battery power.

Consider a common cell phone network configuration using a cluster of base stations with a frequency reuse pattern of 7 used to configure a provider network. It is a system where each cell uses one-seventh of the available communication channels to help ensure adjacent cells do not use the same frequencies to help prevent interference that would be caused when 2 cell phone users in close proximity attempt to place phone calls over the same channel. Each cell phone uses 2 frequencies per call in order to provide full duplex communication so that both parties can talk simultaneously. One frequency is used for the forward communication path, base station to mobile and the other provides the reverse path, mobile to base station communications. A Supervisory Audio Tone (SAT) is an inaudible high pitched tone that helps the system distinguish between callers on the same channel, but in different cells.

AMPS (Advanced Mobile Phone System) is a first generation analog cell phone system that has been available in the USA since 1983. An AMPS cell phone provider typically is allotted 832 frequencies to use in a city. 42 frequencies are used for cell phone control channels leaving 790 for voice communications. 2 frequencies are used for each voice channel leaving 395 voice channels per coverage area. Again a common configuration it to allocate one seventh of the available frequencies to each cell, which means that within any cell 56 people can talk at one time on first generation analog cell phone system file AMPS. AMPS uses FM (frequency modulation) for voice transmission and FSK (frequency shift keying) for signaling. Each call uses a different frequency. This type of spectrum sharing is know as FDMA (frequency division multiple access).

Newer digital systems make better uses of the available channels enabling multiple simultaneous calls over voice channels. A digital cell phone system using TDMA (Time Division Multiple Access) can handle 168 simultaneous calls, 3 times the number that can be handled on an analog system. CDMA (Code Division Multiple Access) is a method for transmitting simultaneous signals over a shared portion of the spectrum. Qualcom for example operates CDMA cell phones in the 800 MHz band and 1.9 GHz PCS (Personal Communication Service) band. CDMA phones are noted for having excellent voice quality and long battery life. CDMA is less costly to implement, requiring fewer cell sites than GSM or TDMA digital cell phone systems and providing 3 to 5 times the calling capacity. CDMA is becoming widely used in North America and is also expected to become a 3rd generation technology for GSM (Global System for Mobile Communications). Currently GSM uses TDMA and is the predominant system in Europe and is also used around the world. Unlike GSM and TDMA, which divides the spectrum into different time slots. GSM defines the entire cellular system, not just the air interfaces (e.g. FDMA, TDMA, etc . . . ). CDMA uses a spread spectrum technique. A narrow band voice signal is spread across the full bandwidth of the CDMA channel. By using different codes, voice conversations share the full bandwidth. TDMA has a precise limit to the number of simultaneous calls it can support. CDMA has no hard limit. The quality of the call starts to diminish as additional users are added.

Roaming is a term used to describe a cell phone's ability to utilize another cell phone provider's network in order to place a call in an area without service by their provider. Roaming occurs when the subscriber of one wireless service users another providers wireless network. Roaming occurs if the System Identification Code (SID) on the control channel does not match the SID programmed into the user's cell phone. Roaming charges may be expensive especially since the second provider often has no direct preexisting financial contract with the user when the call is placed. In addition, the full complement of cell phone functions may not be available through another carriers network especially if it is an older analog network. If roaming is enabled on the cell phone and the carrier's signal becomes weak, roaming can occur even if it is a cell phone in operating in its' own home calling area. In addition, if the user's network provider is at full capacity in the cell, all 56 channels being utilized for example, the cell phone may be configured to roam, using another provider's network instead of having the call dropped or blocked.

Since cell phones rely on radio waves that travel through air, communication can at times be unreliable. Metal objects, weather conditions, large buildings, hilly terrain, and other objects can interrupt phone calls or prevent cell phone communication in specific areas of a cell all together. Antenna positioning and the surrounding landscape can create dead spots in a cell where signal strength is weak or non existent. This can be frustrating for customers especially when a dead zone coincides with their place of residence. The user may have a cell phone that works well most of the time, but when at home the cell phone may be non-operational or provide highly intermittent reception where many calls are dropped.

Furthermore, cell phone providers tend to concentrate on building cells and providing service in highly populated areas and areas well traveled. It is not uncommon to find no service outside of major cities or incur substantial additional roaming charges. This can be particularly frustrating for people with a favorite weekend retreat or the primary or second home away from the city. Users are often required to pay for a separate land-line with a different phone number in order to have phone service. A person attempting to reach someone may first call their cell phone number, then call their home number, then call their business number and finally try the number at their second home (assuming they know all these numbers). When the service is available call forwarding can be used to redirect phone cells from one number to another, but that requires repeated manual procedures to enable and disable.

There are systems available commercially that capture signals from an existing cell, transmit via wires into a building and then amplify and rebroadcast the signal within the building. These systems also capture the signal from cell phones within the building, transmit via wires to an antenna outside the building and them amplify the signals and rebroadcast. These systems can be used improve signal quality within a building in an existing cell. However, these systems do not extend the network outside the cell, but simply amplify existing cell phone signals within an existing cell. They require specialists to install and set up the equipment.

The Global Positioning System (GPS) was designed to allow users to determine their precise position anywhere on earth. It was originally designed for military navigation, but can now be used by anyone. With a relatively simple inexpensive receiver one's position anywhere on the earth can be determined at any moment. GPS consists of 27 earth-orbiting satellites, 24 in operation and 3 spares. Each satellite makes 2 complete rotations every day. The satellites are arranged so that at least 4 are visible in the sky at any location on earth at any time. The GPS receiver determines the distance to each satellite. With that information and using a mathematical principle called trilateration precise position can be determined. Regularly, at predetermined instants of time, the satellites begin transmitting a pseudo-random code. The receiver begins running the same digital pattern at the same time. By comparing the patterns from each satellite, it can determine the time lag which is then uses to determine the distance to each satellite. Only 3 satellites are required to determine one's position, but with the distance information from a 4th satellite the receiver can determine how far off its' quartz clock is from the extremely precise, but very expensive atomic clocks on each satellite and correct for any errors due to clocking variations. Thus, inexpensive quartz clocks can be used to reduce the cost of a GPS receiver and still provide extremely accurate positioning.

Caller ID can be used to transmit the phone number and sometimes the name of the caller to the phone receiving the call right after the first ring. A standard phone uses a 90 Volt AC 20 Hz ring signal. A technique known as FSK (Frequency Shift Keying) is used to transmit ASCII characters to the caller ID modem circuitry in-between the first and second ring

SUMMARY

The embodiments of the present invention is a cellphone base station transceiver capable of spontaneously and substantially automatically creating a new cell in a communication network. This new cell provides an indiviual-Point-Of-Connect, which will be referred to as iPOC, for cell phone users that address many of these and other problems. The iPOC system, methods, devices, and computer programs provides wireless standard cell phone communication in areas where no cell phone service exists or within dead zones in existing cell phone network cells. Various embodiment of the iPOC include a portable, substantially-automated, user-installable dynamically-configurable cell phone base station device.

Many of the embodiments described in the remaining text describe iPOC can be used to create a new cell in a cell phone network, because that is an obvious and extremely useful exploitation of the invention. Nevertheless it should be understood that iPOC can be used to create a new cell in virtually any communications network, not just cell phone networks or telephone networks.

One embodiment of the iPOC base station connects through a communications network to the cell phone providers network dynamically creating a new cell in order to provide cell phone communications at a remote location where no service is currently offered or within a dead cell zone where poor or intermittent service within a cell is encountered. In this embodiment, when the iPOC base station is initially powered on, it connects a cell phone network controller via one or more interconnected communication channels such as a computer network, the Internet, a LAN (Local Area Network), a WAN (Wide Area Network), an analog telephone line with modem, a dedicated telephone line, a wireless LAN or other available communication channels. The many different communication channels can be utilized as long as they provides sufficient bandwidth and low latency to facilitate acceptable voice communications. Once a communication link is established with the appropriate cell phone provider's network controller, the iPOC base station transmits information about itself to the network controller and requests that it be added and connected as a new cell to the providers existing cell phone network. The network controller can be the MTSO (Mobile Telephone Switching Office) server of the cell phone provider for that area and handles the requests directly. Another embodiment would use a controller independent of the cell phone provider's network controller. It would be used to do some amount of screening and preprocessing of the iPOC cell phone provider's network attachment requests before forwarding the requests to the cell phone provider's network controller. If an intermediate controller is employed, said controller will be used to do some preprocessing to determine the physical location of the new cell and then forward the request to the appropriate MTSO. This will be a MTSO for a specific geographic area in the provider's network. In another embodiment the iPOC portable base station is configured with a Global Positioning System (GPS) receiver allowing it to easily determine its' precise position. The controller routes the portable base station location information to the cell phone provider requesting that it be configured into their network. Each iPOC portable base station has a unique identifier. The cell phone provider checks the information which would include location of the portable base station, maximum antenna transmission power and other parameters. The iPOC base station may have a small number of hardwired operating frequencies or the frequencies may be configurable by the network provider's controller or intermediate controller. If the provider determines that in the geographic area of said iPOC base station that the frequencies available to use will not interfere with the existing network or other iPOC units in the vicinity it can elect to make this iPOC portable base station part of its' network thus creating a new cell in their existing wireless network. The provider will determine how many channels the iPOC can use and on which frequencies it will operate to ensure that it will not interfere with the existing fixed network of permanent base stations. One embodiment of the iPOC would have one or more reserved cell phone channels, operating frequencies, for the iPOC unit to simplify the processes of ensuring the iPOCs do not interfere with the existing cell phone network. Once the iPOC is connected as part of the cell phone providers network, the iPOC portable base station may have limited function supporting only a single cell phone connection or a small number of specific number of cell phones to simplify the design and minimize interaction with the provider network. Yet another embodiment would be configured with the full complement of functional capabilities similar to a permanent base station of the provider's network. If the network controller looses communication with a portable base station or finds it is unresponsive to commands it will remove it from its' network.

Another embodiment of the iPOC base station would use a low power transmission with a single control channel and a small number of voice channels to provide communication for a small number of cell phones used in a geographically fixed small establishment such as a home or office. Another embodiment of said low power iPOC base station would have reserved communication frequencies to simplify the design for a single establishment supporting a small number of cell phones.

Another embodiment of the iPOC base station is a device that connects directly to a standard phone jack to interface to the POTS (Plain Old Telephone System) or PSTN (Public Switched Telephone Network). A cell phone user finding poor quality service or no cell phone service in a particular geographic area where they plan to reside for some time, say their home or a hotel room or a second home, can connect this embodiment of the iPOC base station to a standard PSTN. This embodiment of the iPOC base station is a compact simplified cell phone base station transceiver that wirelessly communicates with standard cell phone via standard cell phone interfaces and protocols used by the cell phone provider. The iPOC unit converts standard cell phone wireless signals, commands and voice channel into standard land line telephone signals so that a standard PSTN can be used to handle a cell phone call when normal provider network service does not exit at a particular site. In this embodiment the iPOC base station supports one or more cell phones, but perhaps more typically a single cell phone. It has a limited number of voice channels to keep the unit small and simple. The iPOC unit is connected to a standard phone jack via a standard phone cable and powered on. When iPOC unit is powered on and detects a cell phone in its' micro-cell operating area, it dials a predefined phone number and through a standard PSTN line using an integrate phone modem in the iPOC unit it establishes a communication connection to a network controller, a server or other piece of electronic equipment. Via this connection it has established over a standard PSTN communications channel with said controller the iPOC unit requests permission to join the Cell Phone Provider's Network so that phone calls for this cell phone can be redirected to said iPOC unit. Said server may be the MTSO of the cell phone network provider or an intermediate controller that does some preprocess of the request. In either case, if the cell phone network provider approves the request and allows said iPOC unit to become part of their network, cell phone calls will then be forwarded to said iPOC unit through the PSTN. If the iPOC unit is permitted to become part of the cell phone providers network, it will disconnect the modem communication interface from the PSTN phone line and wait for an incoming call from the PSTN or an outgoing call from the cell phone. The iPOC unit will respond to any incoming call assuming it is a cell phone call and attempt to establish communication with the cell phone network. In this manner both normal PSTN phone traffic and cell phone calls coming from the cell phone network can be handled by a cell phone connected through the iPOC. When caller ID is unavailable, the phone number to which the iPOC unit is connected will need to be manually entered so that the cell phone network knows where to direct the calls. If call ID is available it will be determined by the network automatically.

In this embodiment of the iPOC when the cell phone provider's network controller receives an incoming call for said cell phone, it now redirects the call through the standard PSTN to the phone line associated with the phone number it received from the iPOC unit when said iPOC unit first negotiated connection to the network. When the iPOC unit receives a ring signal from the PSTN it transmits corresponding signals to the cell phone causing it to ring. The iPOC unit uses the same signals and communication interface to the cell phone a standard cell phone base station uses. It sends out a digital paging message for the mobile on the forward control channel. The mobile receives the page, confirms and seizes the control channel. The iPOC unit assigns a voice channel and sends the assignment to the cell phone on the forward control path and at nearly the same time transmits the SAT on the forward voice path. The mobile tunes to the assigned channel, receives the tone and transponds the tone back to the iPOC unit on the reverse voice path. The iPOC unit detects this and sends an alert order using blank and burst on the voice channel to the mobile causing the cell phone to ring. If the cell phone user answers the call, the iPOC unit detects this via standard cell phone communications and takes the line back to the PSTN off hook. The iPOC unit converts the analog voice signal coming in from the phone line into wireless analog or digital signals depending on which specific cell phone system it operating with to engage in a call. The iPOC also converts wireless analog or digital signals on the voice channel from the cell phone into analog voice signals on the phone line so that a complete 2 way phone connection with the cell phone is established via the PSTN.

For an outgoing call from the cell phone, the cell phone user simply uses the cell phone in the same way they would use it when connected to a standard network cell. They can dial or enter the phone number of the phone they wish to call into the cell phone and presses talk. The standard wireless signals for the particular cell phone network are transmitted between the cell phone and the iPOC unit through which the call is routed. The iPOC unit converts the cell phone signals into a off hook on the phone line and once it detects a dial tone, it transmits the phone number through phone line in order to establish a connection. One embodiment of this invention would have the iPOC unit first dial a predefined phone number, perhaps a toll free 800 number, to establish a connection to the cell phone provider's network through the standard PSTN. Once this connection is established, the iPOC unit would transmit the phone number for which the cell phone user wishes to place the call. In this way the cell phone provider can be aware of all outgoing calls from the cell phone.

In this embodiment of the invention, if the iPOC unit looses contact with the cell phone for some predetermined period of time it will reestablish contact with the cell phone network through its' phone modem interface and inform the cell phone provider to resume normal cell phone operations and not to forward calls to this number on the PSTN.

Unlike a standard cell phone network where voice quality is not guaranteed, where calls can be dropped and voice quality can be quite poor at times, an iPOC cell will typically provide much higher voice quality. The position of a standard network cell base station is fixed and signal quality at different positions in a standard network cell is dictated by objects and signals that may cause interference, by the weather and by the unique signal transmission characteristics of the area, all of which change over time. By utilizing the iPOC dynamic portable user-installable base station connected directly to a hardwired land line of the POTS, the cell phone user will more often experience voice quality comparable to a standard telephone because the cell phone user can minimize interference and signal degradation since distance between the iPOC unit and the cell phone will be much shorter. In addition, with an iPOC unit plugged directly into a land line the specific position of the iPOC unit can be changed as necessary to improve signal quality within the iPOC cell. For example the iPOC unit used in a home might be moved from the down stairs to the upstairs phone jack. Repositioning the base station is not something a cellphone user controls in a standard network cell. The cell-phone base-station interface it designed to provide good voice quality when the phone is many miles from the base station. Using this same protocol in a small micro cell can improve voice quality.

Another embodiment of this invention is to use the iPOC unit as a high quality cordless phone base station. It can plug into a analog phone line or any communication channel with sufficient bandwidth and latency to support phone traffic. Outgoing calls from the cell phone can be sent out directly through the analog phone line or other communication network. Incoming calls are routed directly to the number for the analog phone line, through the iPOC unit and on to the cell phone. This of course could only happen if the cell phone network provider, the FCC and other regulatory organization in various countries permit use of these cell phone frequencies for this type of application.

Yet another embodiment is envisioned that enables the cell phone to respond to both incoming calls from the cell phone network provider being routed through the iPOC unit as well as normal telephone calls coming in through the analog phone line number.

In another embodiment of the invention, caller ID is used to allow the iPOC base station to share a phone line with another phone. In this embodiment the iPOC unit upon detecting a ring signal will intercept and examine the caller ID information. If it recognizes the info, it will accept the call other wise it will do nothing.

In yet another embodiment of this invention the iPOC base station is configured with a means for determining its location such as GPS (Global Positioning System) in the iPOC unit. GPS allows the iPOC unit to determine its' location so that when it first contacts the cell phone network provider controller to negotiate being added to the provider network the controller can use the location information to aid in deciding if it should allow the iPOC unit to become part of the network. For example it could determine that operation of the iPOC unit might interfere with the existing substantially permanent-fixed network. It could also give the OK to join the network, but first adjust the power level or the voice/control channel frequencies being used to help ensure no interference occurs.

Although keeping the iPOC unit functionally simple could help ensure it is compact, portable, low power and easy to install, the state of electronic technology is such that complex functions can be implement in a small number of VLSI (Very Large Scale Integration) chips and in microcode stored in dense ROM (Read Only Memory) Chip and in other relatively small HDDs (Hard Disk Devices) that allow compact automated design be realized creating devices with robust sophisticated functionality. With sufficiently low-latency high-bandwidth communication interface available, it is possible for the iPOC units to be in direct contact with the MTSO and implement complex function, such as call hand off between adjacent cells in the network or borrow and share voice channels with adjacent cells during peak load periods. It would be possible for a large number of cells to be created by iPOC units to lessen the need for more permanent base stations in a particular cell phone provider network area.

Proper frequency allocation is critical for ensuring the portable iPOC base station does not interfere with the existing cell phone network. The iPOC unit can be designed with GPS (Global Positioning System) functionality so that when it initially powered on, and then again at regular intervals, it determines its' location and transmits the location to the cell phone provider network controller. In this way the provider's controller can automatically configure said base station to use only frequencies that will not interfere with the standard fixed cells in the immediate area of the portable iPOC base station. It is also possible for the cell phone service provider to utilize the iPOC base station to service other cell phone users. In this way the iPOC base station can be used to help fill holes in the overall provider network.

Another embodiment of this invention is envisioned where an iPOC base station transceiver device is created using an information processing device such as a personal computer or laptop computer. Some information processing devices today are equipped with a wireless transceiver used to establish a communication link with a wireless router for connecting to networks such as the Internet. In this embodiment of iPOC, a wireless transceiver in the information processing device would be used differently. It would be designed to communicate with a cell phone via a standard wireless cell phone interface. Via hardware integrated into the information processing device or a combination of integrated hardware and executable programs in microcode and application software, an information processing device can be configured to function as an iPOC base station transceiver. Said information processing device can function as an iPOC bases station transceiver when appropriately equipped and configured to communicate with a cell phone and when it has an adequate communication channel with sufficiently high bandwidth and sufficiently low latency that allows it to connect to a separate communication system such as a telephone system or cellphone system to route calls and provide voice communications. For example, if this is implemented in a laptop computer, one embodiment would allow a spontaneous micro-cell be formed automatically any time the lap top is operational and connected to a communications network. Naturally it is important that the iPOC unit not interfere with existing networks at that location or violate FCC or other country regulations. This could be accomplished by restricting the frequencies it uses, minimizing transmission power and the size of the new micro cell or determining its' geographic position and configuration it appropriately. This embodiment could provide the user with cell phone communications in the vicinity of their lap top world wide completely independent of the cell phone system being used in the country he resides anytime his laptop is running and connected to an adequate communications link.

Yet another embodiment is envisioned where the iPOC unit is set up an a completely remote location with no utility electric power. In this embodiment battery power or solar power or a combination of the two would be used to power the iPOC unit in order to create a new cell. A satellite link could be used to connect the iPOC unit to a network controller to negotiate establishment of the new cell. The satellite line would also be used as the conduit for cell phone communications.

Another embodiment of the invention would listen to determine what other cells are operating in it's vicinity and communicate this information back to an intermediate server or the cell phone provider's network directly. This information could be used to determine if an iPOC unit should be allowed to join the network and what operating characteristics (e.g. voice channel frequencies, number of voice channels, antenna power transmitting levels, control channels, etc . . . ) it should be configured with and allowed to use. For an already operational iPOC unit the information could be collected over time and shared with cell phone providers to help understand traffic patterns to help in planning future expansion of their more permanent network structure.

DETAILED DESCRIPTION OF THE INVENTION

The embodiments of the present invention enhances cell phone network performance and extends the range of operation through with a portable dynamically configurable base station.

Figure 1:
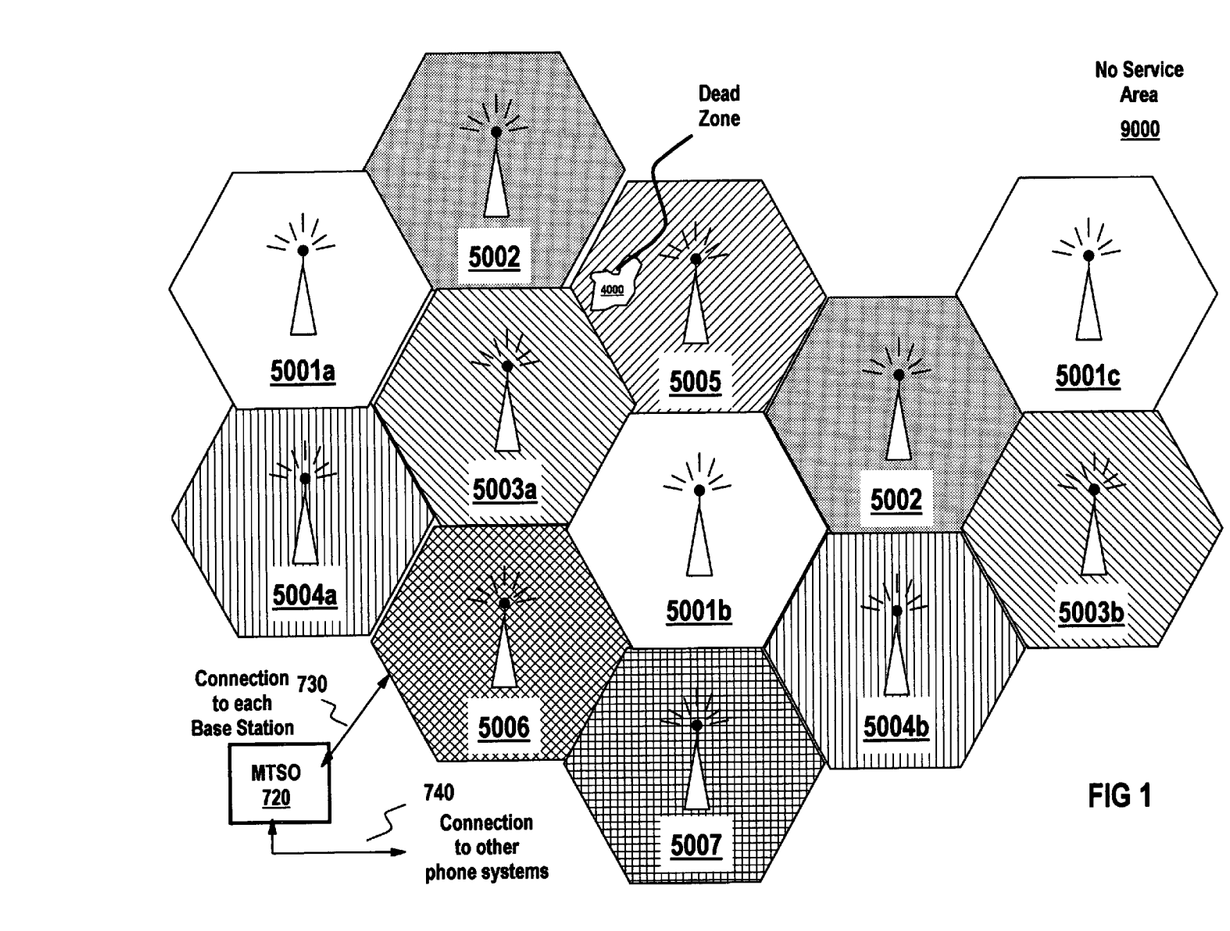
FIG. 1 is an example of a cell phone network composed of individual cells create using cell phone base stations illustrating how no adjacent cell uses the same set frequencies thus preventing interference.

FIG. 1 is an example of how an existing cell phone network can be configured using individual base stations to create individual cells that when used together create a cell phone network. In this example cells 5001, 5002, 5003, 5004, 5005, 5006, 5007 are each assigned unique voice channel and control channel frequencies. Typically, the cell phone network will have 56 voice channels and 6 control channels. Allocation of unique frequencies to 7 different cells facilitates network configurations where each of the 7 cell types can be reused in the network so that adjacent cells do not use the same frequencies. This configuration helps prevent call interference since cells using the same frequencies are not adjacent to each other. In FIG. 1 it can be seen that the frequencies assigned to cells 5001 is reused 3 times in this network 5001a, 5001b, 5001c and that these cells are not directly adjacent to one another. The same non-adjacency rule holds true for the other cells in the illustration using the other 6 frequencies. A cell network control station 720, a MTSO (Mobile Telephone Switching Office) interfaces with and controls each base station. The MTSO handles phone connections to other phone systems too, using communication channel 740. In this illustration the cell phone network is comprised only of the area covered by all the cells. The area outside the cells is a "No Service Area" 9000 where no base station signals reach. There is cell phone service from this provider in area 9000. There is a Dead Zone 4000 in cell 5005 where signal strength is weak due to unique topology characteristics of the area.

Figure 2:
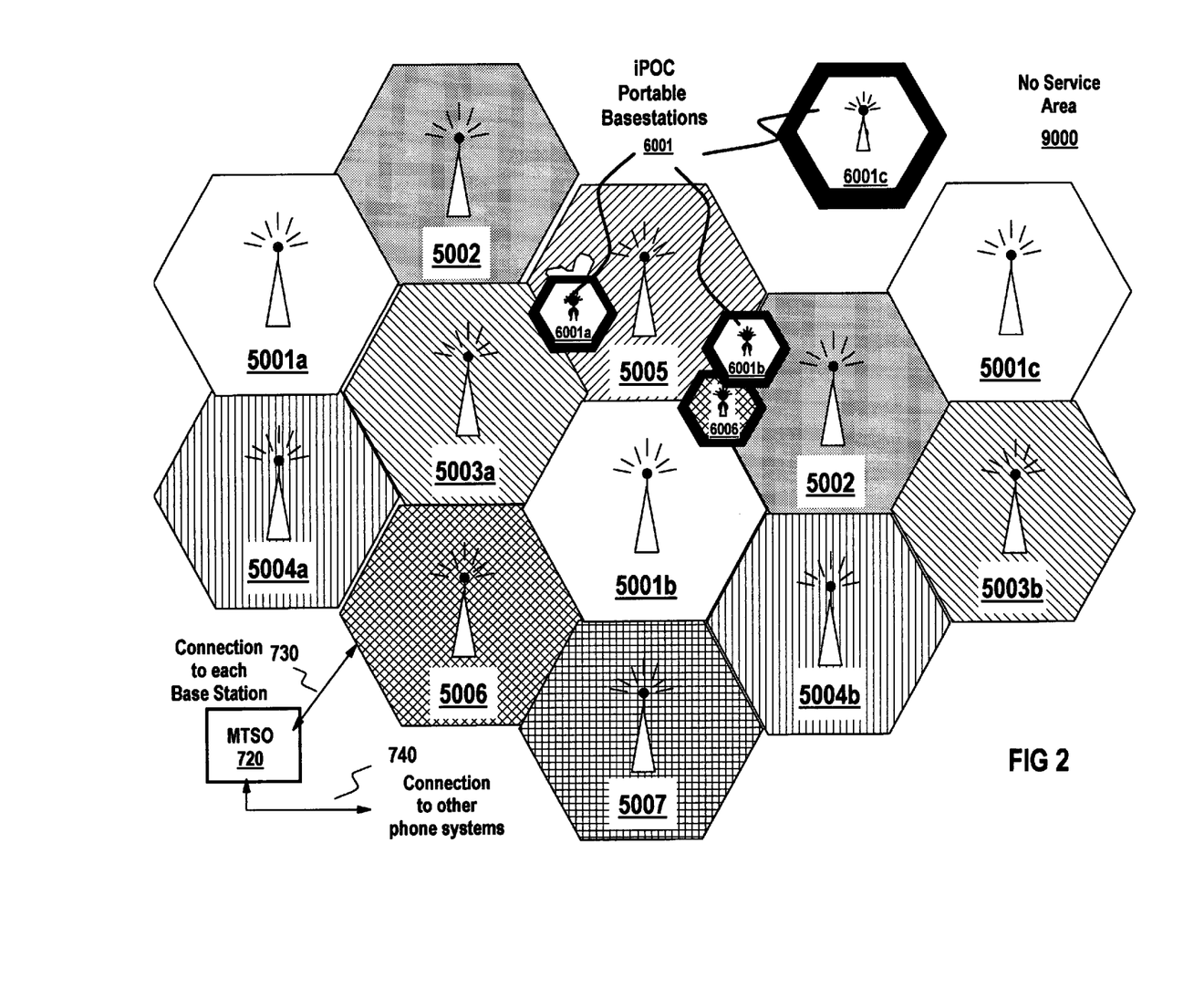
FIG. 2 illustrates the iPOC base station can be used to enhance the cell phone providers network by creating new cells in areas where no service is currently provided or where signal strength within an existing cell is weak.

FIG. 2 illustrates how the iPOC base station can extend cell phone service to the sample network depicted in FIG. 1. The iPOC is used to enhance the cell phone providers network by providing service to areas where no service is currently provided and where signal strength within an existing cell is weak. In this example in FIG. 2 iPOC base station cells 6001a, 6001b, 6001c and 6006 are used to enhance the network described in FIG. 1. In the example the iPOC base station cells 6001 and 6006 use the same voice and control frequencies as in permanent base station for cell type 5001 and 5006 respectively. Said iPOC base station cell 6001c is used to provide service in the "No Service Area" 9000 in an area well away from the existing permanent cell phone provide's network so interference with other cells in not an issue. Said iPOC base station cell 6001a is used to fill dead zone 4000 in cell 5005. Since cell 5005 uses different frequencies than iPOC cell 6001a no interference will occur. The closest permanent cell that iPOC cell 6001a might possibly interfere with is permanent cell 5001b. When iPOC cell 6001a first negotiates to be added to the network its physical location and transmitting power must be determined and used to decide which frequencies it should be assigned to help prevent interference with nearby permanent cells. Another embodiment of this invention is to assign unique voice and control channels to portable base stations which are not used in the permanent network, but that would be recognized as communication channels by the cell phones. This would simplify administration and guarantee that they do not interfere with permanent base stations. However, it would still be desirable to analyze the physical location and transmitting power to ensue they don't interfere with other iPOC base station cells. In this example iPOC base station cell 6001b is physically located near where permanent cells 5005 and 5002 meet. The frequencies used by iPOC cell 6001b are the same as that used by 5001, so its' channels will not interfere with 5005 nor 5002. The iPOC cell 6001b overlaps with 6006, but again since they use different channel frequencies there is no interference. Other embodiments using spread spectrum technologies like CDMA could simplify the frequency assignment for iPOC cells by providing special codes that are only used by iPOC cells.

Figure 3:
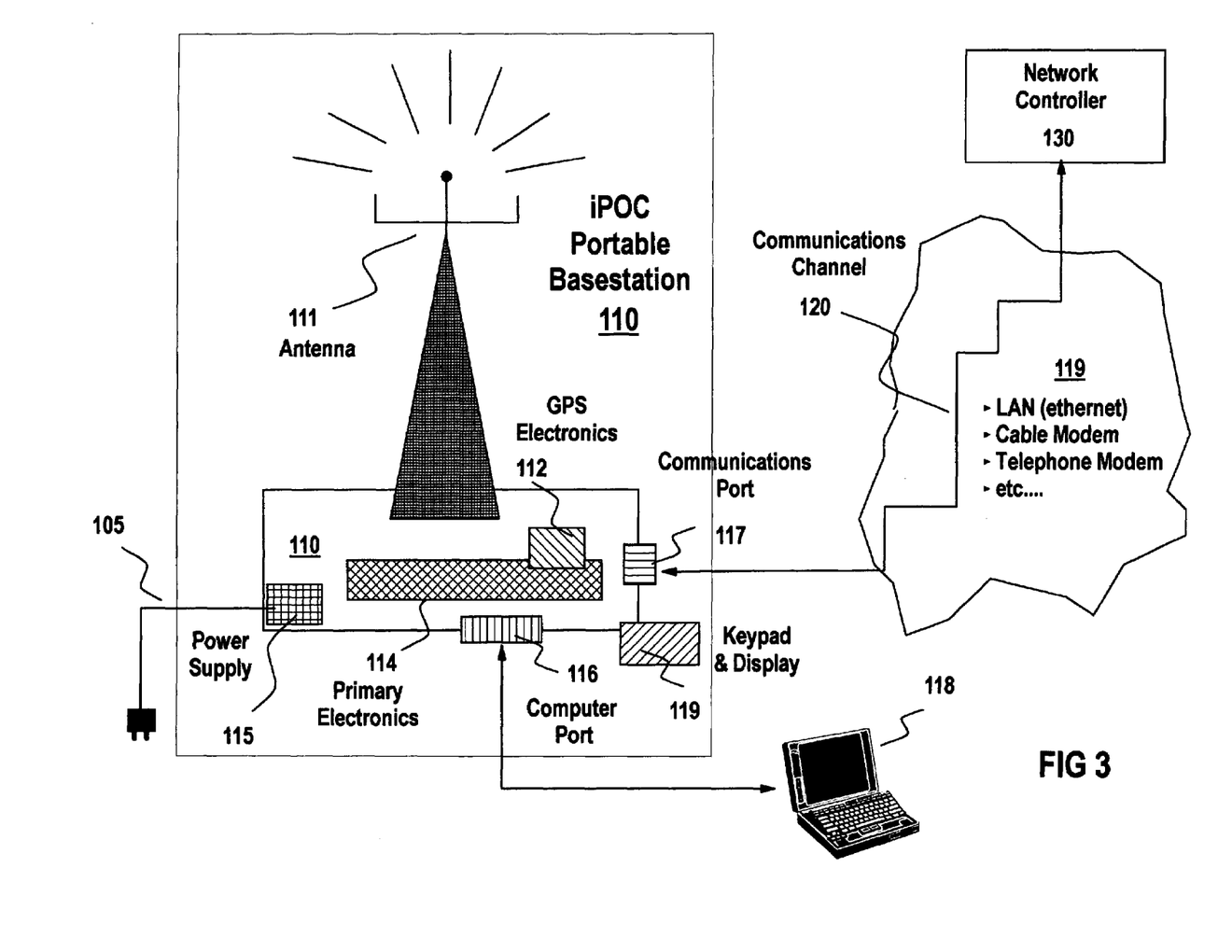
FIG. 3 illustrates one embodiment of an iPOC portable user installable dynamic base station.

FIG. 3 illustrates an embodiment of an iPOC base station 110. It has an antenna 111 used to transmit and receive signals from a cell phone in the vicinity of said iPOC unit 110. Said antenna 111 is connected to electronics 114 with the iPOC unit 110 that provides the functionality of iPOC unit 110. There is a power supply 115 that connects to via power code 105 to an AC wall outlet to provide power for the electronics and the antenna. It would also be possible to free DC power in from outside the unit. Embodiments that draw power from the a phone line are envisioned. There is a GPS feature 112 in this embodiment. This embodiment has a communications port 117 that connects the iPOC unit 110 to a cell phone network controller 130, which can be an intermediate server or the MTSO controller via a communication network 119 to create communication path 120. Communication plan 120 is used by iPOC unit 110 to communicate with network controller 130 to facilitate negotiation to determine if iPOC unit 110 will be allowed to become a base station connected to the cell phone providers network and the media for cell phone communication. Communication network 119 can be any communication medium that has sufficiently low latency and sufficiently high bandwidth to facilitate cell phone communication. Common media include ethernet connections, a dedicated phone line like a T1 line, a standard switched telephone line, a modem connection over an standard telephone line, a cable modem connection, DSL (digital subscriber line) or virtually any other type of communication channel. In this embodiment there is a computer port 116 that allows 118 a computer or lap top to connect to the iPOC unit 110. Another embodiment would include an alphanumeric keypad and display 119 used to configure iPOC device 110. The computer 118 can be used to configure the unit or it could be used as a permanent subsystem of the iPOC unit in order to simply the electronics of iPOC unit 110. Another embodiment of the iPOC unit would be to implement the iPOC functionality as code running on computer 118 with the iPOC unit 110 as an integrated set of electronics within computer 118. In this embodiment the iPOC unit 110 could be just an antenna with minimal electronics. In fact it could even be a pluggable card (e.g. PCI card or USB device) into the computer 118 or built in as a standard part of the computer 118.

Figure 4:
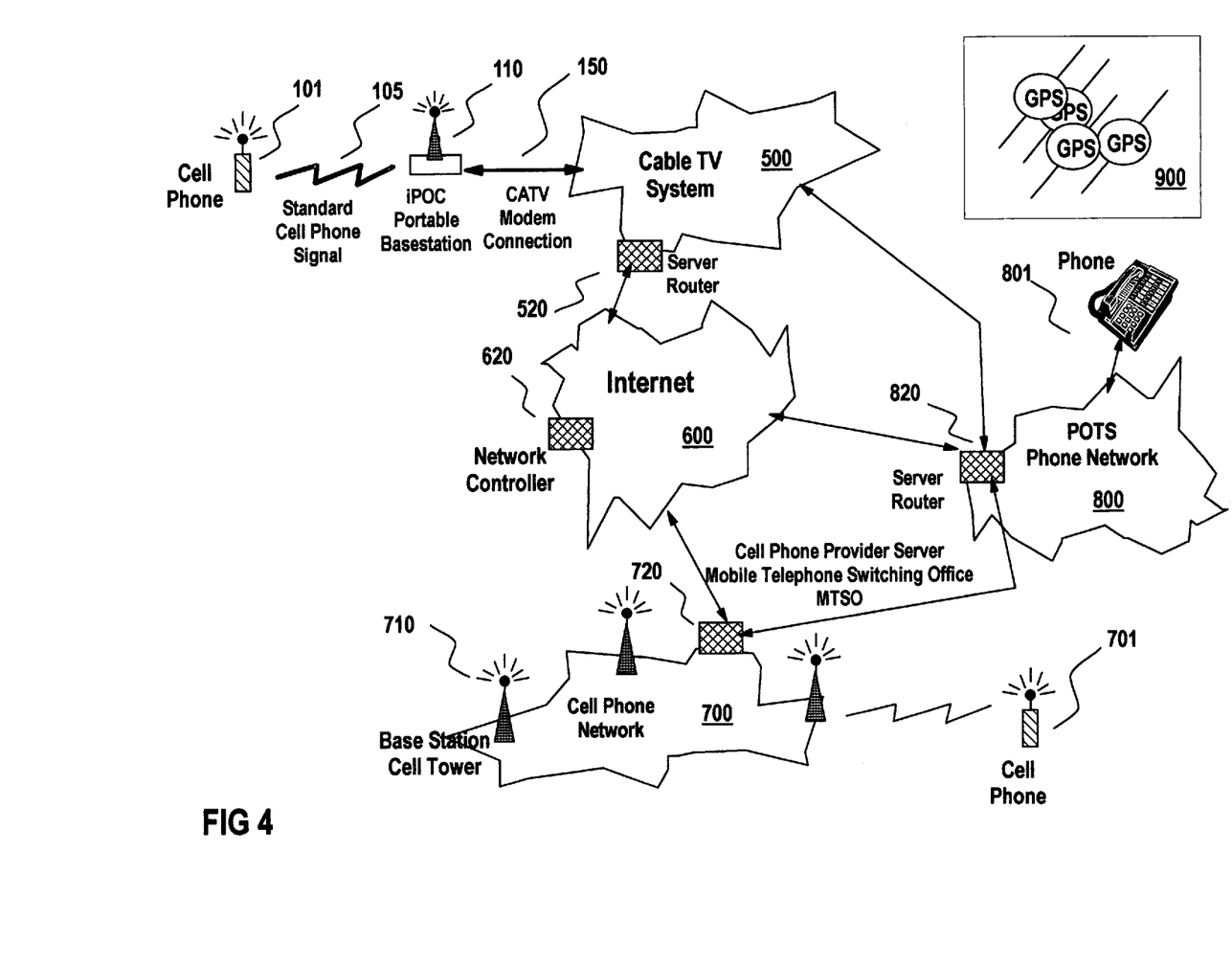
FIG. 4 illustrates an embodiment of this invention with an iPOC base station connected via several different communication channel paths to a cell phone providers network.

FIG. 4 illustrates an embodiment of this invention which is a system with iPOC base station 110 that is in communication with cell phone 101 via the standard cell phone signals and protocol 105 this cell phone providers network. The iPOC base station 110 connects to network 500 via connection path 150 to provide the first leg of the communication path for cell phone communications at a remote location where no service is currently offered or to provide service in a dead cell zone where poor or intermittent service within a cell is encountered. In this embodiment network 500 is a cable TV system network, but this invention is not limited to this type of network. Network 500 can be any network with suitable latency and bandwidth. When iPOC base station 110 is initially powered on, it connects through network 500 to unit 520. Unit 520 is a server, a router, or other type of equipment that enables network 500 to communicate with other networks which in this embodiment is Internet 600. Said device 520 in turn connects through the Internet 600 to network controller 620. In this embodiment the connection path 150 from iPOC base station 110 to said communication network 500 is via a cable modem using standard modem protocol. In other embodiments of the invention other communication medium and communication protocols with suitable latency and bandwidth can be used. Connection paths using ethernet, fiber optic cable, T1, telephone line with modem, or wireless LAN are envisioned. Once a communication path is established between iPOC base station 110 to network controller 620, iPOC base station 110 provides information about itself to network controller 620 and requests that it be connected as a new cell to the providers existing cell phone network. In this embodiment network controller 620 is an intermediate controller that establishes a communication path with MTSO (Mobile Telephone Switching Office) network controller 720. Other embodiments are envisioned with multiple intermediate controllers for large system configurations. Another embodiment is to have the MTSO network controller 720 be the only network controllers thus eliminating the need for network controller 620. Yet another embodiment is to configure the system so that network controller 620 and MTSO network control 720 are one in the same and the MTSO handles the request directly. In the embodiment illustrated in FIG. 5 intermediate network controller 620 does some preprocessing to determine the physical location of the new cell and then forwards the request to MTSO network controller 720, the MTSO network controller for the geographic area that portable iPOC base station 110 wishes to join in cell phone providers network 700. In the embodiment in FIG. 4 GPS satellites 900 are used by electronics in iPOC base station 110 to determine its locations. Other embodiments using other location determination techniques are also envisioned. Another embodiment would be to have multiple MTSO network controllers where network controller 620 first determines which MTSO network controller for which requests should be forwarded. Network controller 620 routes the iPOC base station 110 information to the cell phone provider's MTSO network controller 720 requesting that it be configured into network 700 as a new cell. The iPOC base station 110 will have a unique identifier to distinguish it from other iPOC base stations. The cell phone provider's controller 720 checks the information which it receives from network controller 620, which in this embodiment includes location of the iPOC base station 110 functional characteristics such as maximum antenna transmission power, operating frequencies and other parameters. The iPOC base station 110 can be configured with one or more hardwired operating frequencies or it can be dynamically configured to use frequencies that that network controller 620 or MTSO network controller 720 select during initial set up and activation. If the cell phone provider controller 720 determines that operating said iPOC base station 110 in the geographic area where it is located will not result in interference with the existing networks it can elect to allow it to be configured as a new iPOC cell in their existing wireless network. The cell phone provider will determine how many channels it can use and the operating frequencies to ensure that it will not interfere with the existing fixed network of permanent base stations. Once portable iPOC base station 110 is configured as part of the provider network 700, said portable base station may have limited function to support a single or small number of specific cell phone users. Other embodiments envision it to be configured with the full complement of functional capabilities, more like the permanent base stations of the provider's network including more complex functions like hand-off of calls to adjacent cells as the cell phone moves in and out of range of said new iPOC cell. If MTSO controller 720 looses communication with the iPOC base station 110 or finds it is unresponsive to commands it will remove it from its' network. After the initial negotiation by the iPOC base station 110 to become part of the network, call traffic to and from the iPOC unit 110 to cell phone network 700 may propagate through a variety of communication paths and does not necessarily have to always travel through network controller 620, unless of course there is a need to monitor all communications traffic at a central point. Embodiments of this invention well include dynamic interconnection with multiple dynamic communication paths with full duplex communication supported. The Internet for example uses protocols TCP/IP which facilitates reliable transmission and re-assembly the data packets at the end destination. The package may travel over a variety of communication paths and mediums even if the packets arrive out of order. Some embodiments of this invention are envisioned using TCP/IP as well as other protocols. Indeed, FIG. 4 illustrates that network 500 can also connect through server/router 820 in POTS network 800 back through Internet 600 or directly to cell phone network 700 through MTSO controller 720 as yet other communication paths. Many different paths are possible through the network allowing cell phone 101 to place or receive phone call to other phones including standard phone 801 connected to POTS network 800 and cell phone 701 connected to the cell phone providers network 700.

Figure 5:
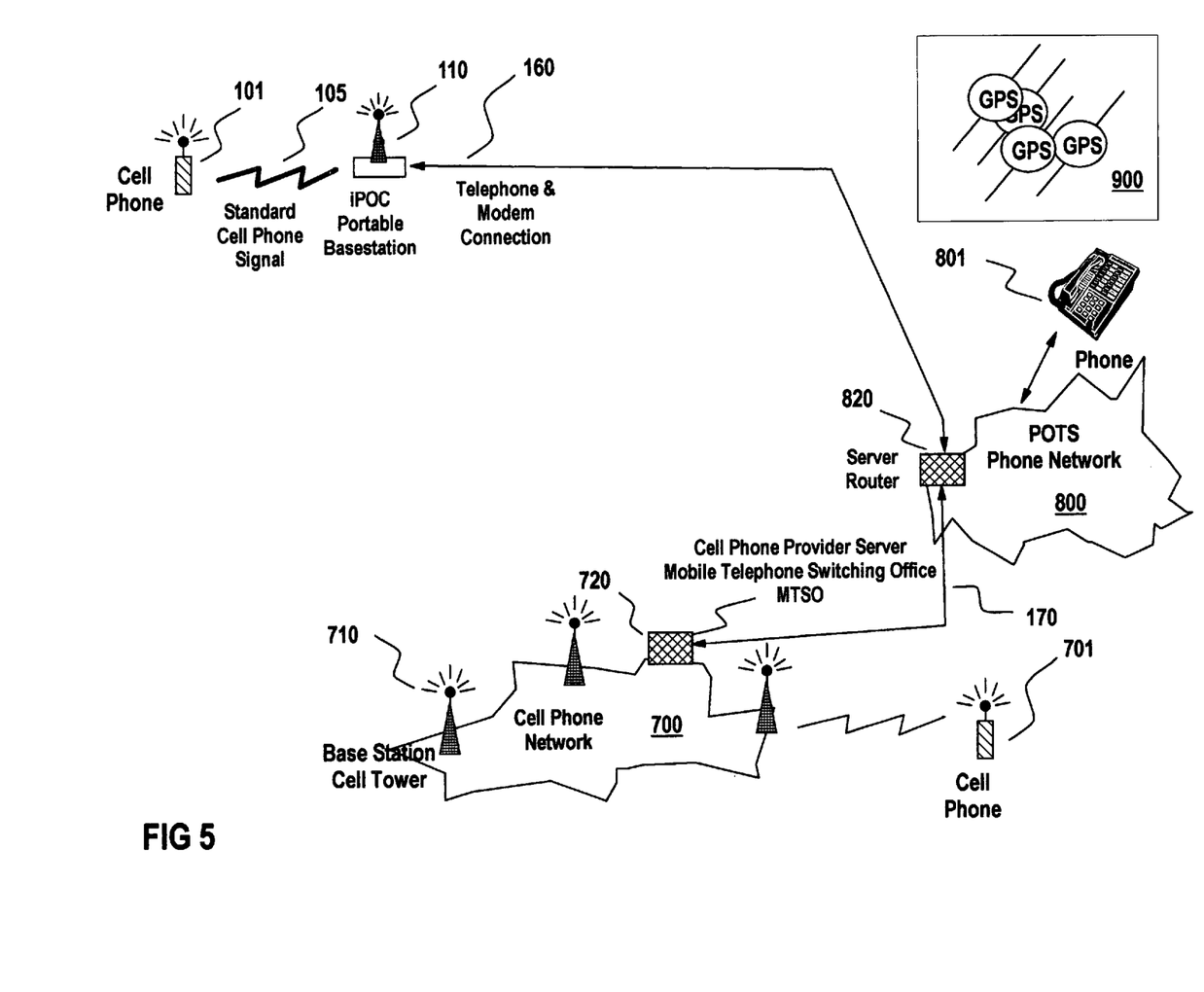
FIG. 5 illustrates an embodiment of this invention with an iPOC base station connected via a standard telephone communication channel path via a POTS to a cell phone providers network.

FIG. 5 depicts another embodiment of a system using iPOC base station 110 connected to POTS network 800 via standard telephone connection 160. The iPOC unit 110 is a cell phone base station transceiver that wirelessly communicates with standard cell phone 101 via the cell phone network providers standard cell phone signals, interface and protocols 105. The iPOC base station 110 converts standard cell phone wireless signal, commands and voice channel into standard land line telephone signals so that a standard POTS network 800 sends and receives calls through standard POTS switching equipment to unit 820. In this embodiment, a simplified low power base station 110 supports a small number of cell phones, perhaps most normally only a single cell phone 101. In this embodiment iPOC unit 110 is connected to a standard phone jack via a standard phone cable and powered on. When iPOC unit 110 detects a cell phone 101 in its' mirco-cell operating area it dials a predefined phone number through the POTS network to MTSO controller 720 which answers the call creating communications path 160 and 170. Using an integrated phone modem in iPOC base station 110 said iPOC unit 110 uses a communication paths 160 and 170 to MTSO controller 720 to request permission to join the Cellphone Provider's Network 700, so that phone calls for cell phone 101 can be redirected to said iPOC unit 110. Other embodiments of the invention are envisioned where MTSO network controller 720 may be or an intermediate server that does some preprocess of the requests. In either case, if the network provider approves the request and allows said iPOC unit 110 to become part of cell phone network 700, from then on, cell phone call will be forwarded to said iPOC unit 110 through the POTS 800. In this embodiment of the invention, if the iPOC unit 110 is permitted to become part of the cell phone provider's network 700, it will disengage communication path 160 and 170, disconnecting the modem communication interface and wait for an incoming call from the POTS 800 or an outgoing call from cell phone 101. Where caller ID is unavailable the phone number of the phone line to which the iPOC unit 110 is connected will be entered manually, otherwise it will be automatically transmitted to cell phone network provider's network controller 720 via POTS 800.

When the cell phone provider's network 700 receives an incoming call for said cell phone 101, it now redirects the call through the standard POTS 800 to the phone line using the phone number where the iPOC unit 110 is connected establishing communication path 160 to the iPOC unit 110. When the iPOC unit 110 receives a ring signal from the POTS 800 it transmits corresponding standard signals for that network provider to the cell phone 101 over standard cell phone wireless communication interface 105 causing cell phone 101 to ring. The iPOC unit 110 converts standard POTS signals and protocols to a standard cell signal 105. In this embodiment iPOC unit 110 sends out a digital paging message for the mobile 101 on the forward control channel. The mobile 101 receives the page, confirms and seizes the control channel. The iPOC unit 110 assigns a voice channel and sends the assignment to the cell phone on the forward control path and at nearly the same time transmits the SAT on the forward voice path. The mobile 101 tunes to the assigned channel, receives the tone and transponds tone back to the iPOC unit 110 on the reverse voice path. The iPOC unit 110 detects this and sends an alert order using blank and burst on the voice channel to the mobile 101 causing the cell phone 101 to ring. If the cell phone user answers the call, the iPOC unit 110 detects this via standard cell phone communications and take the line back to the POTS 800 off hook. The iPOC unit 110 converts the standard POTS voice signal coming in from the phone line via communication path 160 into wireless analog or digital signals for the specific cell phone system being used to permit the cell phone 101 engages in a call. It also converts 105 wireless analog or digital signals on the voice channel from the cell phone 101 into analog voice signals on the phone line communication channel 160 so that a complete full duplex 2 way phone connection with cell phone 101 is established. Calls between cell phone 101 and any other phone in the interconnected phone network like traditional telephone 801 or cell phone 701 can be established. Other embodiments are also envisioned.

For an outgoing call from the cell phone 101, the cell phone user enters the phone number they wish to call into the cell phone and presses talk. The standard wireless signals 105, for this cell phone network provider, are transmitted between cell phone 101 with the iPOC unit 110 through which the call is to be routed. In this embodiment iPOC unit 110 converts the cell phone signals 105 into an off hook on the phone line. Once it detects a dial tone it transmits the phone number through phone line communications channel 160 in order to establish a connection. One embodiment of this invention would have the iPOC unit 110 first dial a predefined phone number, perhaps a toll free 800 number, to establish a connection via communication path 170 to cell phone provider MTSO controller 720 through the standard POTS 800. Once this connection is established the iPOC unit 110 would transmit the phone number for which the cell phone user wishes to place the call. This way the cell phone provider can be aware of all outgoing calls from cell phone 101. Calls between cell phone 101 and any other phone in the interconnected phone network, like traditional telephone 801 or cell phone 701 can be established. Other embodiments are also envisioned including using an intermediate server vs. connecting directly to MTSO network controller 720 directly.

In this embodiment of the invention, if iPOC unit 110 looses contact with the cell phone 101 for some significant period of time it will reestablish contact with the cell phone network 700 through its' phone modem interface and inform the cell phone providers network 700 to resume normal cell phone operations and not to forward calls to this number through POTS 800.

Figure 6:
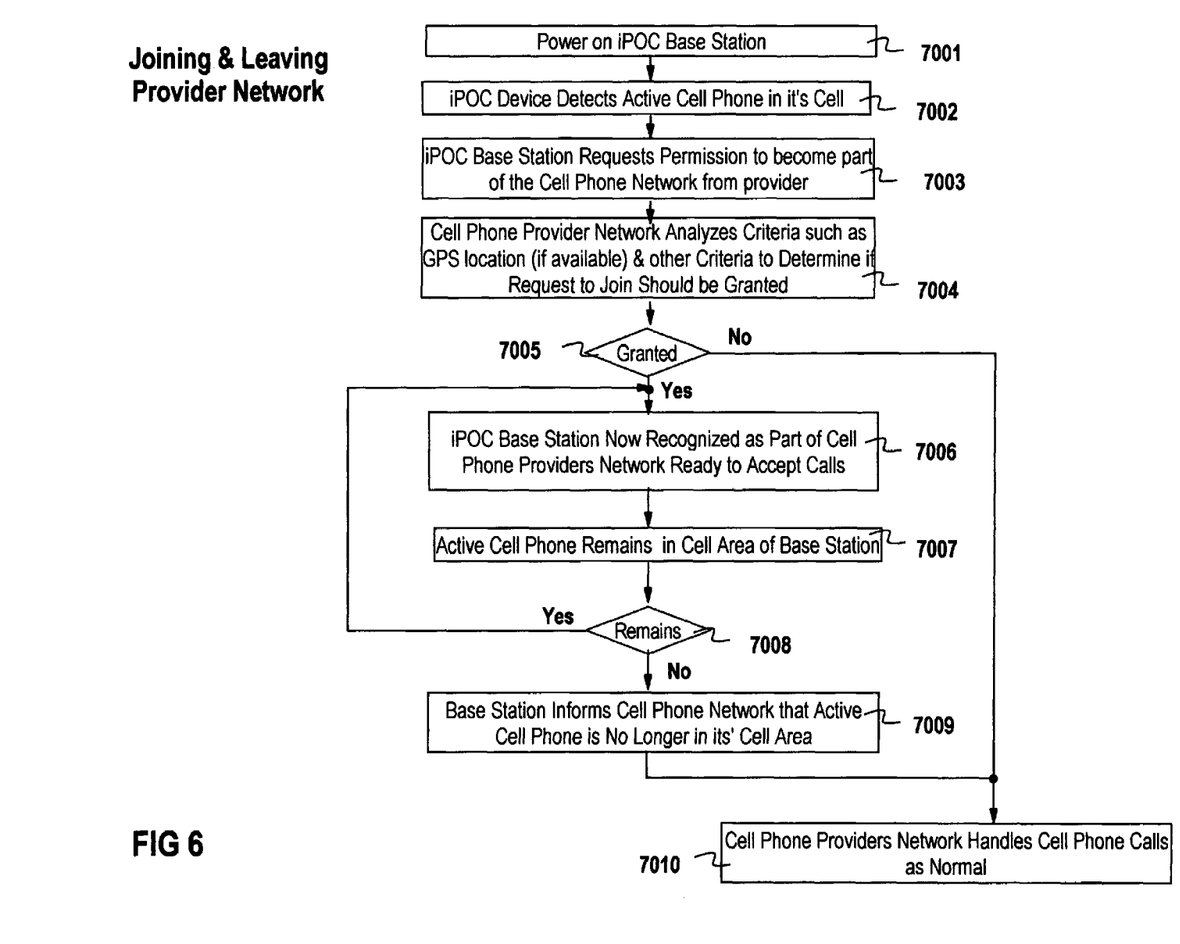
FIG. 6 is a flow chart showing one embodiment of how a iPOC base station where it negotiates to become part of the existing network so that phone traffic is rerouted to it and how it requests to have phone traffic resume normal operation.

FIG. 6 Is one embodiment of the invention showing a logical flow illustrating how an iPOC base station joins and leaves a cell phone providers network Step 7001 is the iPOC device powering on. Some time later after power on 7001 is complete step 7002 occurs where the iPOC device detects an active cell phone in the cell area established by the iPOC base station. Upon detection of the active cell phone the iPOC device initiates step 7003 requesting permission to become an active cell in the cell phone providers network. A decision is made in step 7005 to either not allow the iPOC device to become part of the providers network which in that case step 7010 occurs where the cell phone network continues to handle cell phone calls in its' standard manner. If during step 7005 the iPOC unit is granted permission to join the cell phone providers network step 7006 is executed where the iPOC base station is now recognized as part of the cell phone providers network and is ready to handle call traffic. In this embodiment step 7007 is executed if the active iPOC unit looses contact with the all active cell phones in vicinity of the cell it has crested. In step 7008 if it continues to finds an active cell phone it remains in an active cell state. If it no longer find an active cell phone in it's cell, it proceeds to step 7009 where it informs the provider that it is disconnecting from the network as an active cell and the cell phone provider should resume operation, step 7010, where calls are no longer forwarded to this iPOC unit. Another embodiment envisioned where the iPOC unit requests to become an active cell in the provider's network immediately after it powers up, independent of whether or not it detects an active cell phone in its' cell. If granted permission to become part of the network it would remain active indefinitely.

Figure 7:
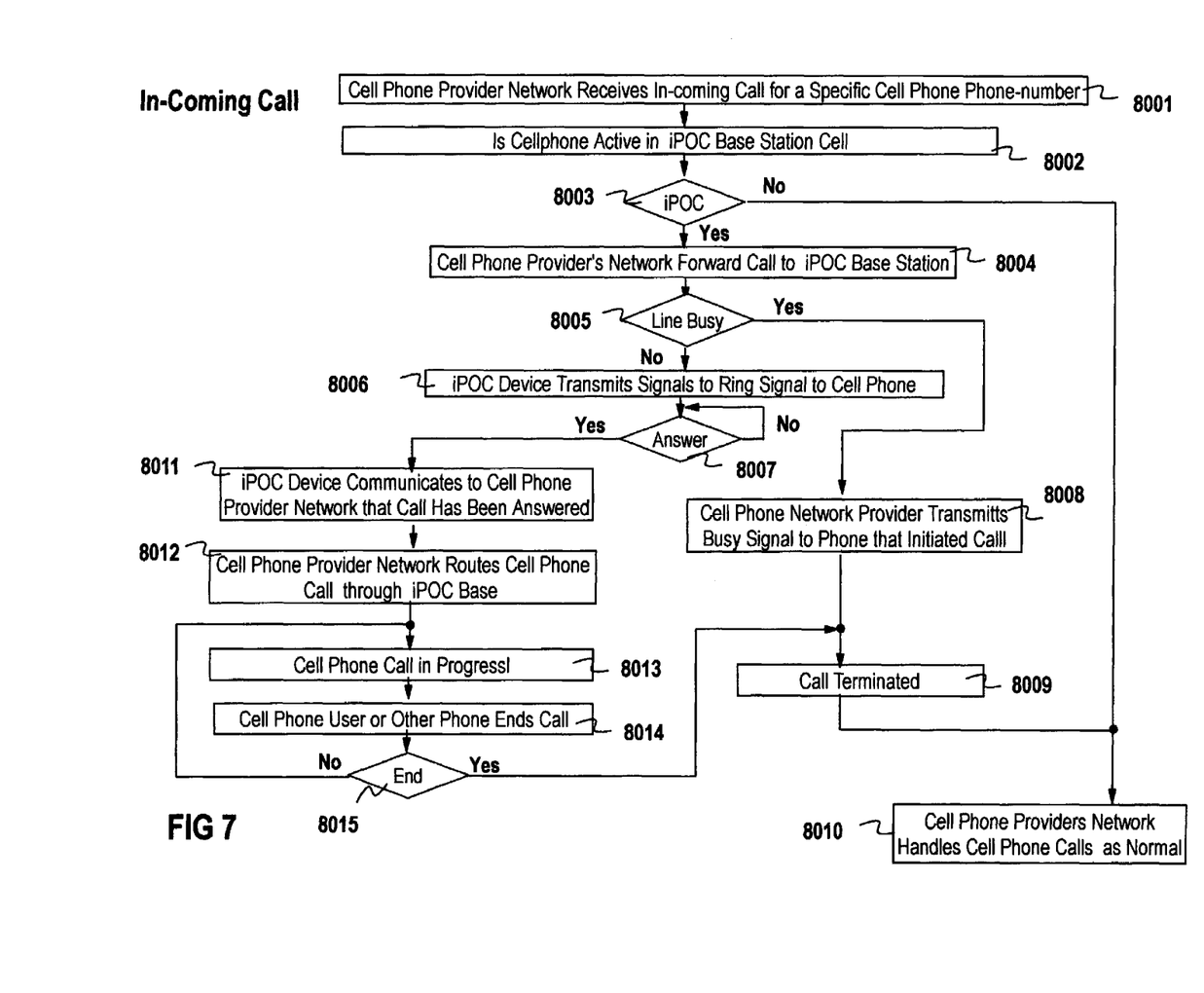
FIG. 7 is a flow chart showing one embodiment of the steps for handling an incoming call.

FIG. 7 Is one embodiment of the invention showing a logical flow illustrating how an incoming call is handled. In step 8001 the cell phone providers network receives an incoming tall for a cell phone. In step 8002 it determines whether or not the call should be directed to a cell phone in an active cell created by an iPOC device that has been allowed to join the cell phone providers network. If in step 8003 it determines that this call is not to go to an active cell phone in an iPOC cell it proceeds to step 8009 and handles the call in the standard manner for the network. If in step 8003 it determines the call is intended for a cell phone in an active iPOC cell it proceeds to step 8004 where the cell phone network communicates with the iPOC device informing it has a call for a cell phone with a specific phone number in its' cell. In the next step 8005, it is determined if the cell phone is already in use. If it is in use, the iPOC unit transmits a busy signal back through the cell phone' providers network to the phone of the person initiating the call, step 8008. The call is terminated, step 8009 and the provider's network returns to handling calls in it's standard manner, step 8010. On the other hand if in step 8005 the line is not busy then the next step 8006 is executed where the iPOC device transmits signals recognized by the cell phone making it ring. In step 8007 if the cell phone users does not answer the call the phone continues to ring indefinitely. If the call is answered in step 8007 then step 8011 is executed where the iPOC device informs the cell phone providers network that the call has been answered. In the next step 8012, the cell phone provider routes the call to iPOC and completes the connection and the call is in progress, step 8013. The call remains active until either party ends the call, step 8014 and it is the end of the call is detected in step 8009. The call is terminated and the cell phone provider's network returns to normal operation in step 8010.

Figure 8:
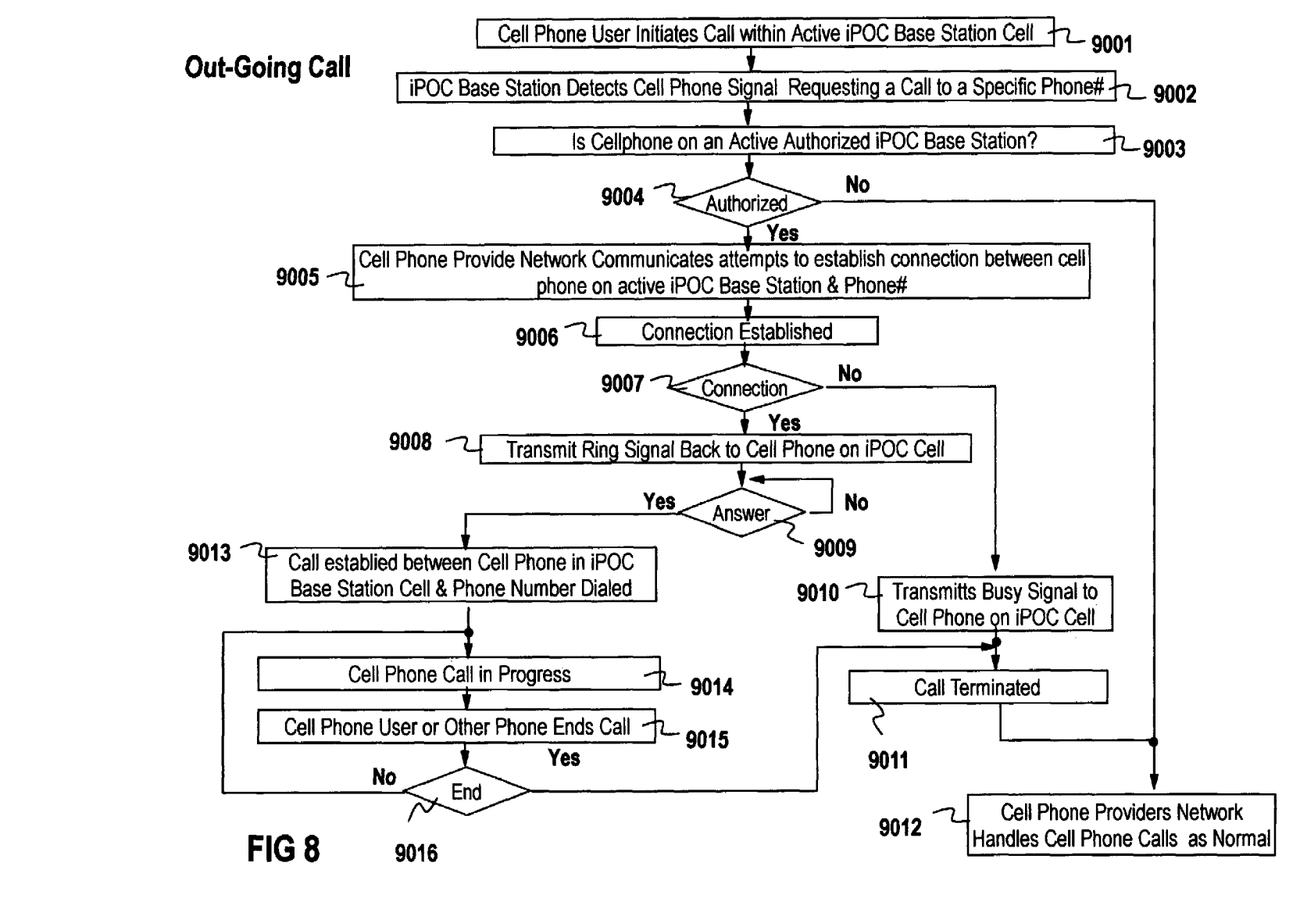
FIG. 8 is a low chart showing one embodiment of the steps for handling an outgoing call.

FIG. 8 Is one embodiment of the invention showing a logical flow illustrating how an outgoing call is handled. In step 9001 a cell user initiates a cell phone call in an active iPOC cell. Next, step 9002, the iPOC device detects the cell phone call request and initiates step 9003 to determine if said cell phone is authorized to use the network. The iPOC unit may have already determined this or may need to communicate with the provider's network to make the determination. In step 9004 if the cell phone is not authorized it takes no action and proceeds with step 9012 where the cell phone providers network continues to operate as before the call attempt. If in step 9004 it is determined that this is an authorized phone, it is then executed in step 9005 where the cell phone providers network attempts to complete the connection with the phone number supplied by the cell phone attempting to place the call in the active iPOC cell phone network. If in steps 9006 and 9007 no connection can be established a busy signal is transmitted back to the cell phone, attempting to place the call in step 9010, the call is terminated step 9011, and the cell phone provider's network returns to normal operations, step 9012. If on the other hand in step 9006 and 9007 a connection can be established a ring signal is transmitted back to the cell phone in the iPOC cell attempting to place the call, step 9008. In step 9009, if the cell phone user does not answer the call the phone continues to ring indefinitely. If the call is answered in step 9009 then step 9013 the iPOC device in conjunction with the cell phone provider completes the connection and the call is in progress, step 9014. The call remains active until either party ends the call, step 9015. It is detects the of the call in step 9016 and the call is terminated in step 9011 where the cell phone provider's network returns to normal operation, step 9012.

Figure 9:
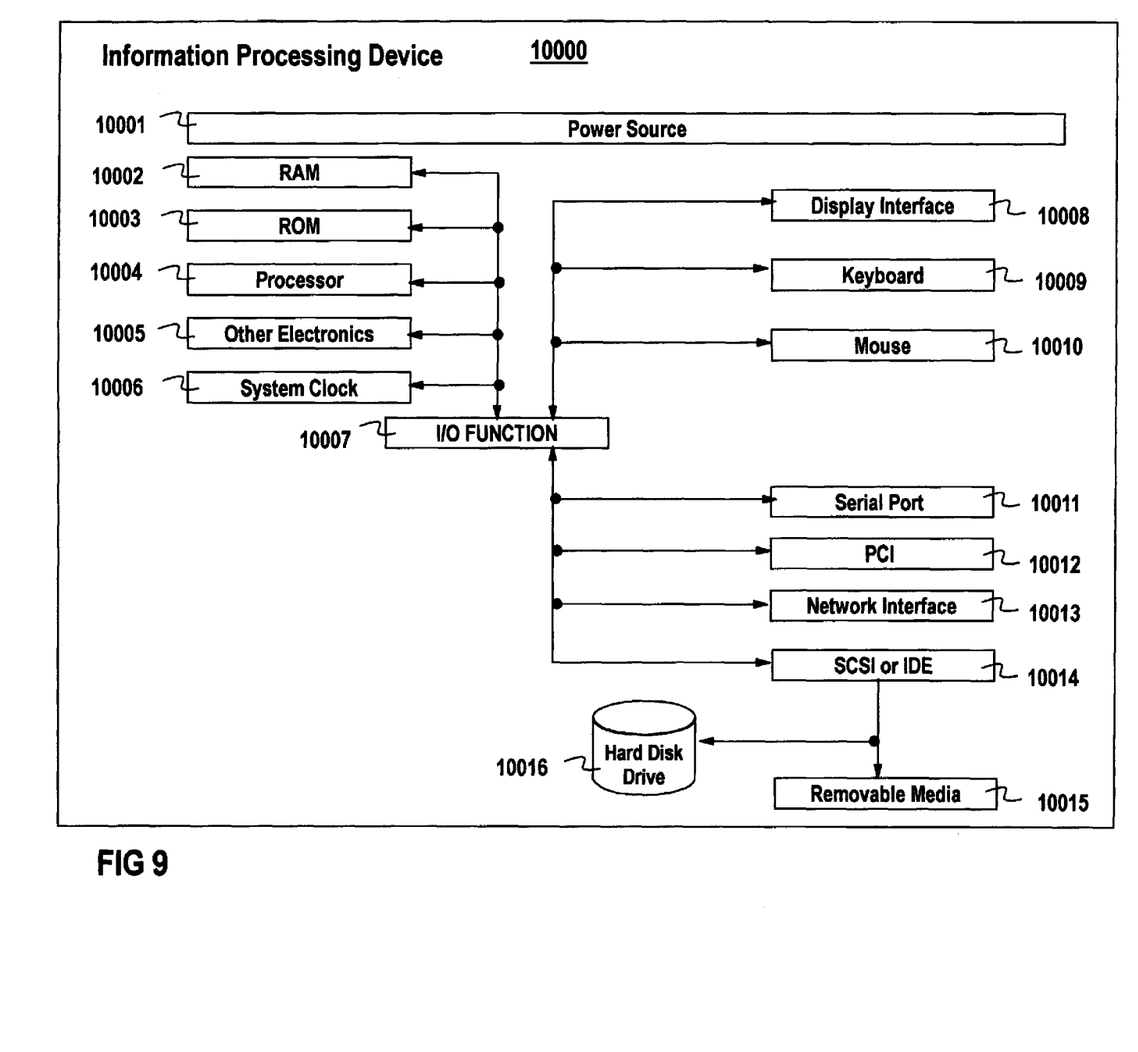
FIG. 9 is an information processing device

FIG. 9 illustrates the major functional components of an information processing device 10000 on which this invention can be realized in whole or in part. The functional elements include a power source 10001, main memory or RAM (Random Access Memory) 10002, Read Only Memory (ROM) 10003, a processor 10004 that executes programming instructions, other electronics 10005 which may be implemented on computer chips or ASICs (Application Specific Integrated Circuits) and a system clock 10006. Information processing device 10000 includes an Input/Output function 10007 that interfaces with display interface 10008, keyboard 10009, and mouse 10010. The I/O function 10007 also includes features and optional interfaces such as serial port 10011, PCI 10012, network interface 10013, and Small Computer Serial Interface (SCSI) or Integrated Device Electronics (IDE) 10014 interface is used to connect to hard disk drive 10016 and removable media device 10015. Most functional elements are designed as a combination of electronic and executable code.

What is claimed is:

1. A personal, low-power, lightweight, compact mobile cell phone base station installable adapter feature, integrated into a personal computer or laptop, to provide temporary intra-building cell phone communications for home, office or travel, supporting a limited number of cell phone users, capable of dynamically and automatically generating a new active cell at a user selectable location to extend a private cell phone communication network coverage area comprising:

electronic circuits used to implement said cell phone base station installable adapter feature;

an antenna interconnected to said electronic circuits for generating electromagnetic signals for communication with a cell phone;

a first communication interface from said cell phone base station installable adapter feature to said personal computer or lap top enabling said cell phone base station installable adapter feature to communication through said personal computer or lap top;

a second communication interface integrated into said personal computer or laptop for establishing a separate communication channel through an ISP (Internet Service Provider) to the Internet or through a PSTN (Public Switched Telephone Network) to a cell phone communication network MTSO (Mobile Telephone Switching Office) controller enabling said cell phone base station adapter feature to connect through said first communication interface through said personal computer or laptop through said second communication interface through an ISP (Internet Service Provider) to the Internet or through a PSTN (Public Switched Telephone Network) to communicate with a cell phone communication network MTSO controller;

a power source for providing energy to allow said electronic circuits, said antenna, and said communications interface to function;

data and an executable computer program resident in a personal computer or lap top system memory and said base station feature enabling said integrated base station to operate in conjunction with said personal computer or laptop computer;

a means of by which said compact integrated cell phone base station feature, operating in conjunction with said personal computer or laptop, identifies itself to a cell phone communications network MTSO controller to negotiate permission for said integrated mobile base station feature for incorporation into said cell phone private communication network as a new additional active cell and use at least 1 cell phone communication channel.

2. An installable mobile cell phone base station adapter feature as in claim-1 capable of negotiating with said cell phone private communication network MTSO controller that has no prior pre-configured data of its existence or location for permission for said installable mobile cell phone base station adapter feature to be incorporation into said cell phone private communication network as a new additional active cell.

3. An installable mobile cell phone base station adapter feature as in claim-1 with sufficiently low transmission power output so that said cell phone base station minimizes interference to preexisting cells so that it is in compliance with pertinent governmental regulatory guidelines and thus can be activated at any user selectable location.

4. An installable mobile cell phone base station adapter feature as in claim-1 that provides the geographic location of installable mobile cell phone base station adapter feature to the cell phone network MTSO to negotiate permission to usage at least 1 cell phone channel that does not interfere with preexisting cells in the private cell phone network and thus can be activated at any user selectable location.

5. An installable mobile cell phone base station adapter feature as in claim-1 that utilizes a least 1 reserved cell phone channel not used by preexisting cell phone network base stations to prevent interference to preexisting cells so that it is in compliance with governmental regulatory guidelines and thus can be activated at any user selectable location.

6. An installable mobile cell phone base station adapter feature as in claim-1 with computer readable media for storing said data and executable computer program.

7. A system for providing temporary intra-building cell phone communications for home, office or travel, supporting a limited number of cell phone users, capable of dynamically and automatically generating a new active cell at a user selectable location to extend a private cell phone communication network coverage area comprising:
- a cell phone;
- a personal computer or laptop;
- a personal, low-power, lightweight, compact mobile cell phone base station installable adapter feature, integrated into a personal computer or laptop,
- a first communication interface from said cell phone base station installable adapter feature to said personal computer or lap top enabling said cell phone base station installable adapter feature to communication through said personal computer or lap top;
- a second communication interface integrated into personal computer or laptop for establishing a separate communication channel through an ISP (Internet Service Provider) to the Internet or through a PSTN (Public Switched Telephone Network) enabling said cell phone base station to connect to and communicate with a cell phone communication network MTSO (Mobile Telephone Switching Office) controller;
- data and an executable computer program resident in a personal computer or lap top system memory and said base station feature enabling said integrated base station to operate in conjunction with said personal computer or laptop computer;
- a means of by which said compact integrated cell phone base station feature, operating in conjunction with said personal computer or laptop, identifies itself to a cell phone communications network MTSO controller to negotiate permission for said integrated mobile base station feature for incorporation into said cell phone private communication network as a new additional active cell and use at least 1 cell phone communication channel.

8. A means for a personal, low-power, lightweight, compact mobile cell phone base station installable adapter feature, integrated into a personal computer or laptop to provide temporary intra-building cell phone communications for home, office or travel, supporting a limited number of cell phone users, capable of dynamically and automatically generating a new active cell at a user selectable location to extend a private cell phone communication network coverage area comprising:
- establishing a communication channel from installable mobile cell phone base station adapter feature through a first communication interface from said cell phone base station installable adapter feature to said personal computer or lap top enabling said cell phone base station installable adapter feature to communication through said personal computer or lap top to a second communication interface integrated into said personal computer or laptop for establishing a separate communication channel through an ISP to the Internet or through a PSTN enabling said cell phone base station to connect to and communicate with a cell phone communication network MTSO controller;
- negotiating permission to generate a new cell from said private cell phone network whereby the operating parameters are determined by said private cell phone network MTSO in communication with said cell phone base station adapter feature;
- analyzing data relative to a predefined criteria in order to determine if said base station should be allowed to be added to said cell phone network;
- granting permission by the private cell phone network within operating parameters established by said private cell phone network;
- incorporating said cell phone base station adapter feature into said communications network if the request to join meets said predefined criteria;
- managing cell phone traffic from a cell phone through said base station through a communication network to said private cell phone network.

9. Computer readable media for storing a computer software for a personal, low-power, lightweight, compact mobile cell phone base station installable adapter feature, integrated into a personal computer or laptop to provide temporary intra-building cell phone communications for home, office or travel, supporting a limited number of cell phone users, capable of dynamically and automatically generating a new active cell at a user selectable location to extend a private cell phone communication network coverage area comprising:
- establishing a communication channel from installable mobile cell phone base station adapter feature through a first communication interface from said cell phone base station installable adapter feature to said personal computer or lap top enabling said cell phone base station installable adapter feature to communication through said personal computer or lap top to a second communication interface integrated into said personal computer or laptop for establishing a separate communication channel through an ISP to the Internet or through a PSTN enabling said cell phone base station to connect to and communicate with a cell phone communication network MTSO controller;
- negotiating permission to generate a new cell from said private cell phone network whereby the operating parameters are determined by said private cell phone network MTSO in communication with said cell phone base station adapter feature;
- analyzing data relative to a predefined criteria in order to determine if said base station should be allowed to be added to said cell phone network;
- granting permission by the private cell phone network within operating parameters established by said private cell phone network;
- incorporating said cell phone base station adapter feature into said communications network if the request to join meets said predefined criteria;
- managing cell phone traffic from a cell phone through said base station through a communication network to said private cell phone network.

* * * * *